United States Patent
Wallen

(10) Patent No.: US 8,472,535 B2
(45) Date of Patent: Jun. 25, 2013

(54) MULTI-CARRIER TRANSMITTER BACK-OFF ESTIMATION

(75) Inventor: Anders Wallen, Ystad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1038 days.

(21) Appl. No.: 12/489,172

(22) Filed: Jun. 22, 2009

(65) Prior Publication Data
US 2010/0239031 A1 Sep. 23, 2010

Related U.S. Application Data

(60) Provisional application No. 61/160,784, filed on Mar. 17, 2009.

(51) Int. Cl.
*H04K 1/10* (2006.01)

(52) U.S. Cl.
USPC ........... 375/260; 375/264; 375/267; 375/297; 455/101; 455/522; 455/103; 455/102; 455/114.3; 455/115.1

(58) Field of Classification Search
USPC ........... 455/101, 522, 103, 102, 114.3, 115.1; 375/260, 264, 297, 267
See application file for complete search history.

(56) References Cited

U.S. PATENT DOCUMENTS

| | | |
|---|---|---|
| 2006/0176969 A1 | 8/2006 | Trivedi |
| 2009/0202017 A1 * | 8/2009 | Ichihara ........................ 375/297 |

FOREIGN PATENT DOCUMENTS

| | | |
|---|---|---|
| WO | 00/01084 | 1/2000 |
| WO | 2009/152835 A1 | 12/2009 |
| WO | 2010/107360 A1 | 9/2010 |

OTHER PUBLICATIONS

3rd Generation Paternership Project 3GPP TS 25.101, 3rd generation parternship project; technical specification group radio access network; User equipment (UE) radio transmission and reception (FDD), release 8; Mar. 2009;vol. 8.6.0.*

3rd Generation Partnership Project. 3GPP TS 25.101, V8.6.0 (Mar. 2009). 3rd Generation Partnership Project; Technical Specification Group Radio Access Network; User Equipment (UE) radio transmission and reception (FDD) (Release 8). Mar. 2009.

* cited by examiner

*Primary Examiner* — Daniel Washburn
*Assistant Examiner* — Rahel Guarino
(74) *Attorney, Agent, or Firm* — Coats & Bennett, P.L.L.C.

(57) ABSTRACT

Methods and apparatus taught herein estimate the amount by which to reduce a multi-carrier signal's maximum transmit power based on metrics specific to each carrier of the multi-carrier signal. These carrier-specific metrics may include a maximum-power reduction or cubic metric determined for that carrier as if it would be transmitted alone. In one embodiment, estimation of the required back-off is based on a weighted sum of the carrier-specific metrics, where the weights applied depend on a power ratio. Only a few relatively small look-up tables or simple computations are required in this case: one for obtaining the carrier-specific metrics based on configuration parameters of each carrier, and another for obtaining the weights based on the power ratio. Accordingly, methods and apparatus herein advantageously require less computational complexity and/or memory usage than that needed if estimating the required back-off based on similar metrics obtained for the multi-carrier signal as a whole.

22 Claims, 4 Drawing Sheets

MULTI-CARRIER TRANSMITTER BACK-OFF ESTIMATION

This application claims priority under 35 U.S.C. §119(e) from the U.S. Provisional Patent Application Ser. No. 61/160,784, which was filed on 17 Mar. 2009 and entitled "Maximum Power Reduction Calculation for Multi-Carrier Signals."

TECHNICAL FIELD

The present invention relates generally to multi-carrier transmitters and particularly to estimating a back-off metric for reducing a multi-carrier signal's maximum transmit power.

BACKGROUND

In practice, a wireless communication transmitter emits energy in frequency regions other than those intended for the transmission. If not limited in some way, the unwanted emissions substantially interfere with other communication systems operating in these frequency regions. Wireless communication standards, therefore, impose limitations on a transmitter's out-of-band (OOB) emissions.

OOB emission requirements typically specify a minimum Adjacent Channel Leakage Ratio (ACLR) for each channel near the intended transmit channel. The ACLR is a ratio of the power emitted in the intended channel to the power leaked into a certain nearby channel.

In general, leakage into nearby channels directly relates to the operating point of the transmitter's power amplifier. The amount of power leaked into nearby channels, for example, increases when the power amplifier operates in its non-linear region, at higher power levels, due to intermodulation distortion. Accordingly, an effective method for achieving a pre-determined OOB emission requirement entails reducing or "backing off" the maximum transmit power on the intended transmit channel from its nominal value.

The amount by which the maximum transmit power must be backed off, while also accounting for amplifier efficiency, depends on the properties of the transmitted waveform (e.g., the modulation, spreading code, spreading factor, gain factors, etc). For some signals, these properties can be well quantified in terms of Cubic Metric (CM) or Peak-to-Average Power Ratio (PAPR), as described in e.g. 3GPP Technical specification TS25.101, Release 8. Such quantities, however, can be costly in terms of processing resources to compute quickly, making estimation of the required back-off upon a dynamic change in the properties of the transmitted waveform particularly problematic.

With various known approaches addressing this issue for single-carrier transmitters, PAPR or CM can be pre-computed for all possible configurations of the transmitted waveform and the corresponding required back-off stored in a look-up table. This approach, however, proves more and more impracticable as the number of configuration possibilities increases, due to the size of the required look-up table. A multi-carrier transmitter, for example, simultaneously transmits two or more separately modulated carriers, each of which occupies a distinct frequency region. See, e.g., multi-carrier operation outlined for inclusion in 3GPP Rel.9, "Dual-Cell HSUPA", 3GPP Work Item Description, RP-090014. When the configuration on each carrier is independent from that of the other carriers, the number of possible configurations of the compound waveform (and thereby the size of the required look-up table) may be several orders of magnitude greater than in a single-carrier transmitter.

SUMMARY

Methods and apparatus taught herein estimate the amount by which to reduce a multi-carrier signal's maximum transmit power based on metrics specific to each carrier of the multi-carrier signal. That is, instead of determining a metric of the multi-carrier signal's compound waveform, the present invention obtains a metric for each carrier of the multi-carrier signal and, in at least one embodiment, combines those metrics to estimate the required back-off.

More particularly, the transmitter of the present invention includes a multi-carrier transmitter back-off metric estimation circuit that obtains a carrier-specific metric for each carrier of the multi-carrier signal. The metric obtained for each carrier indicates, directly or indirectly, the amount by which the maximum transmit power on that carrier should be reduced from a pre-determined nominal maximum transmit power, if transmitted alone, to achieve a pre-determined out-of-band emission requirement. In one embodiment, for example, the carrier-specific metric for a carrier comprises the PAPR, the CM, or any other similar metric of the signal on the carrier. In an alternative embodiment, the carrier-specific metric for that carrier comprises a maximum-power reduction value (e.g., an MPR), determined for that carrier as if it were to be transmitted in a single-carrier transmitter. This MPR value may, for example, directly or indirectly be based on the calculation of a PAPR, CM, or similar metric, or approximations thereof. Irrespective of the type of carrier-specific metrics obtained, the multi-carrier transmitter back-off metric estimation circuit thereafter estimates the back-off metric based on those carrier-specific metrics.

In basing estimation of the back-off metric on these carrier-specific metrics, the transmitter generally requires less computational complexity and/or memory usage than that needed if estimating the back-off metric based on similar metrics obtained for the multi-carrier signal as a whole. Indeed, with the configuration on each carrier defined independently from those on the other carriers, the number of possible configurations of the multi-carrier signal as a whole increases exponentially with the number of carriers. A look-up table mapping configuration parameters of the multi-carrier signal to its PAPR, CM, or MPR, therefore, would be impracticably large, and any calculation of the same impracticably complex. On the contrary, the transmitter in some embodiments maintains a relatively small look-up table mapping configuration parameters of a signal on an individual carrier to its carrier-specific metric, and obtains carrier-specific metrics for all carriers by retrieving each of them from that same look-up table. By using the same small look-up table to obtain each carrier-specific metric, the transmitter requires relatively low memory usage.

Having obtained the carrier-specific metrics, the back-off metric estimation circuit in some embodiments bases estimation of the back-off metric on both the carrier-specific metrics and a power ratio between the power on one carrier and the power on other carriers. This may entail, for example, basing estimation of the back-off metric on a weighted sum of the carrier-specific metrics, where the weight applied to each carrier-specific metric depends on that power ratio. The value of the weights for different power ratios may be expressed as a function of the power ratio, or stored in a look-up table. Accordingly, the back-off metric estimation circuit may require only a few relatively small look-up tables or simple computations: one for obtaining the carrier-specific metrics based on configuration parameters of each carrier, and another for obtaining the weights based on the power ratio.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
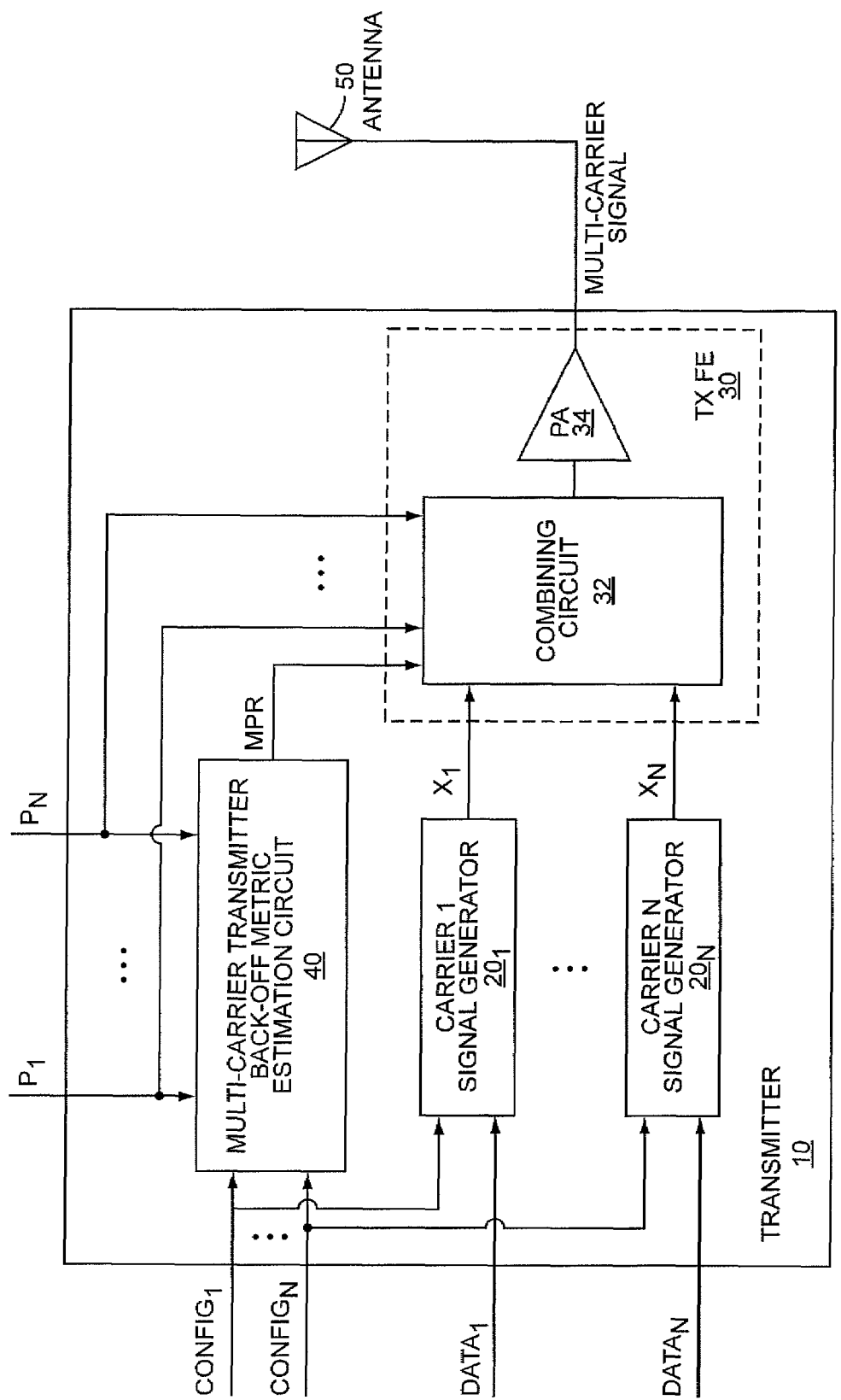
FIG. 1 is a block diagram illustrating a multi-carrier transmitter according to one embodiment of the present invention.

FIG. 1 illustrates one embodiment of a wireless communication transmitter 10 configured to transmit a multi-carrier signal via one or more antennas 50. The transmitter 10 includes a plurality of signal generators 20, a transmitter front-end 30, and a multi-carrier transmitter back-off metric estimation circuit 40.

Each signal generator $20_k$ spreads and modulates a different data signal $Data_k$ onto a different one of N carriers, where each carrier k occupies a frequency region distinct from the other carriers, ($1 \leq k \leq N$). More particularly, a data signal $Data_k$ represents all data to be transmitted on a certain carrier k, including both user information and control information. A signal generator $20_k$ performs channelization and scrambling of the data signal $Data_k$ in accordance with configuration parameters $config_k$ specific to that carrier k (e.g., the number of physical channels present, their gain factors, and their spreading factor and spreading codes). The signal generator $20_k$ thereafter modulates the carrier k with the spread signal in a modulation process that is independent from that of the other signal generators 20 (e.g., by way of multiple, separately modulated, local oscillators). The resulting modulated carrier $x_k$ is thereafter provided to the transmitter front-end 30, such that the front-end 30 receives N separately modulated carriers occupying distinct frequency regions.

A combining circuit 32 included in the transmitter front-end 30 aggregates these N carriers to form a multi-carrier signal. In doing so, the combining circuit 32 weighs together the carriers $x_1 \ldots x_N$ according to the intended transmit power $P_k$ on each carrier (where the sum of the intended transmit power $P_k$ on each carrier is less than or equal to a pre-determined nominal maximum transmit power $P_{max}$). Notably, this aggregation can cause the multi-carrier signal to exhibit certain undesired properties (e.g., a high PAPR or CM). These properties in turn cause the amplifier 34 to generate more intermodulation products (i.e., unwanted frequencies) in the multi-carrier signal when operating at a given power level in the non-linear region. These unwanted frequencies, of course, contribute to the transmitter's out-of-band emissions.

According to the present invention, however, the combining circuit 32 reduces the multi-carrier signal's maximum transmit power by a certain amount; namely that of a back-off metric provided to the combining circuit 32 by the multi-carrier transmitter back-off metric estimation circuit 40. FIG. 1 shows this back-off metric as a maximum-power reduction, referred to herein as "MPR." In reducing the maximum transmit power by the back-off metric MPR, the combining circuit 32 aims to suppress generation of intermodulation products and thereby achieve a pre-determined out-of-band emission requirement (referred to hereinafter as the $OOB_{req}$).

Figure 2:
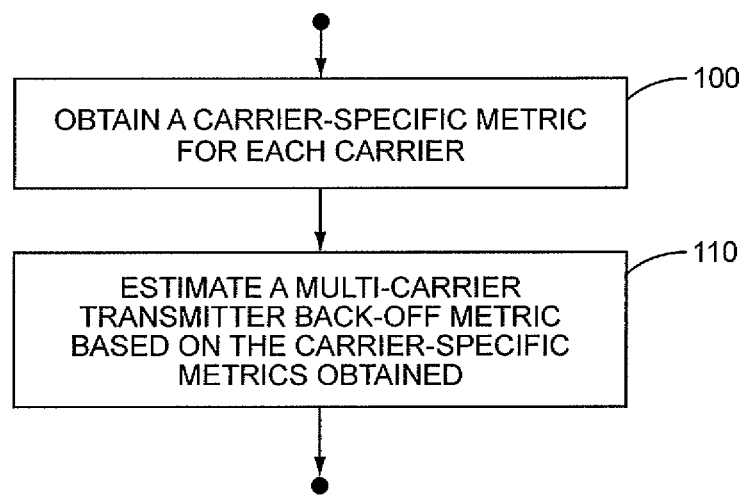
FIG. 2 is a process flow diagram illustrating a method performed by the multi-carrier transmitter of FIG. 1.

The multi-carrier transmitter back-off metric estimation circuit 40 estimates the back-off metric MPR according to the method illustrated in FIG. 2. As shown in FIG. 2, the back-off metric estimation circuit 40 obtains a carrier-specific metric for each one of the N carriers (Block 100). The metric obtained for each carrier k indicates, directly or indirectly, the amount by which the maximum transmit power on that carrier should be reduced from $P_{max}$, if transmitted alone, to achieve the $OOB_{req}$. In one embodiment, for example, the carrier-specific metric for a carrier k comprises a maximum-power reduction value (e.g., an MPR), determined for that carrier as if it would be transmitted in a single-carrier transmitter. In this case, the maximum-power reduction value directly indicates the reduction that would be needed on that carrier k to achieve the $OOB_{req}$. In an alternative embodiment, the carrier-specific metric for that carrier k comprises the PAPR, the CM, or any other similar metric of the signal on the carrier. As the PAPR or CM in particular may be used to determine the above mentioned maximum-power reduction value, these metrics indirectly indicate the reduction that would be needed to achieve the $OOB_{req}$. See, e.g., 3GPP Technical specification TS25.101, Release 8, (specifying that MPR can be readily determined from the CM according to MPR=Max(CM−1,0)). Yet irrespective of the type of carrier-specific metrics obtained, the circuit 40 thereafter estimates the back-off metric based on those carrier-specific metrics (Block 110).

In basing estimation of the back-off metric on these carrier-specific metrics, the transmitter 10 advantageously requires less computational complexity and/or memory usage than that needed if estimating the back-off metric based on similar metrics obtained for the multi-carrier signal as a whole. Indeed, with the configuration on each carrier k defined independently from those on the other carriers, the number of possible configurations of the multi-carrier signal as a whole increases exponentially with N. A look-up table mapping configuration parameters of the multi-carrier signal to its PAPR, CM, or MPR, therefore, would be impracticably large, and any calculation of the same impracticably complex. On the contrary, the transmitter 10 in one embodiment maintains a relatively small look-up table mapping configuration parameters of a signal on an individual carrier to its carrier-specific metric, and obtains carrier-specific metrics for all N carriers by retrieving each of them from that same look-up table. By using the same small look-up table to obtain each carrier-specific metric, the transmitter 10 requires relatively low memory usage. Alternative embodiments that calculate the carrier-specific metrics based on the configuration parameters likewise require relatively low computational complexity.

Figure 3:
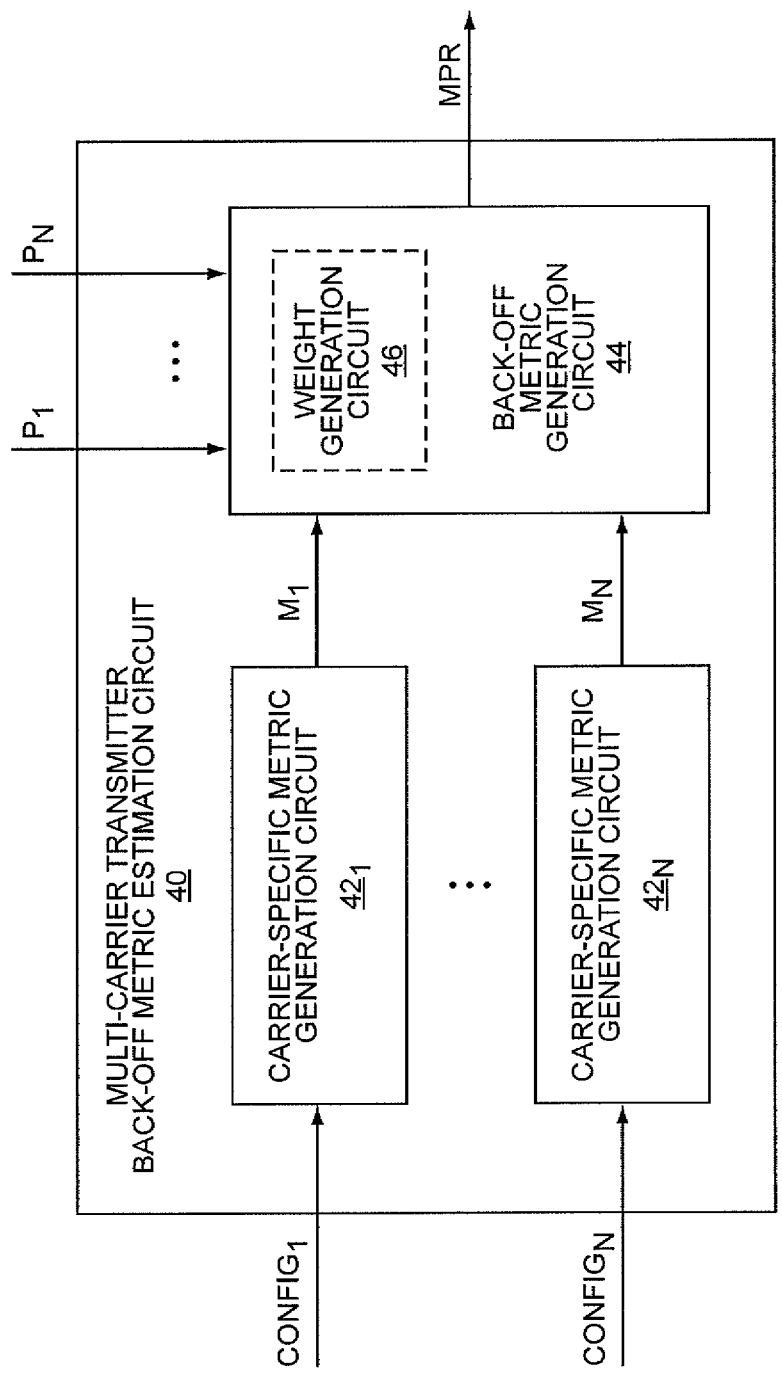
FIG. 3 is a block diagram illustrating a multi-carrier transmitter back-off metric estimation circuit according to one embodiment of the present invention.

In the embodiment illustrated in FIG. 3, for example, the multi-carrier transmitter back-off metric estimation circuit 40 includes a plurality of carrier-specific metric generation circuits 42. Each carrier-specific metric generation circuit $42_k$ is configured to obtain a carrier-specific metric $M_k$ by calculating that metric, or retrieving it from a look-up table, based on configuration parameters $config_k$ specific to that carrier k. Such configuration parameters may vary depending on the whether the signal on carrier k is formatted according to standards for WCDMA, LTE, etc. For instance, the configuration parameters may include gain factors for the physical channel in the signal when formatted according to WCDMA, or resource block allocations and modulation scheme when formatted according to LTE. Of course, as mentioned above, the look-up table mapping these configuration parameters to carrier-specific metrics may be common to each carrier-specific metric generation circuit 42.

FIG. 3 also provides additional details for basing the back-off metric estimation on the carrier-specific metrics obtained. Specifically, the back-off metric estimation circuit 40 of FIG. 3 further includes a back-off metric generation circuit 44 that receives each carrier-specific metric $M_k$, as well as the intended transmit power $P_k$ on that carrier k. In one embodiment, therefore, the back-off metric generation circuit 44 bases estimation of the back-off metric MPR on both the carrier-specific metrics $M_1 \ldots M_N$ and power ratios $PR_k$ between the power on each carrier k and the power on other carriers:

$$PR_k = \frac{P_k}{\sum_{j=1, j \neq k}^{N} P_j} \text{ or, alternatively, } PR_k = \frac{P_k}{\sum_{j=1}^{N} P_j} \quad (1)$$

$P_k$ and $P_j$ can represent either the total power on the carriers (i.e., the power of all channels on each carrier) or the power of less than all channels on the carriers (e.g., the power of a single control channel on each carrier). This may entail, for example, basing estimation of the back-off metric MPR on a weighted sum of the carrier-specific metrics $M_1 \ldots M_N$, where the weight a applied to each carrier-specific metric depends on or is otherwise a function of the power ratios $PR_k$:

$$MPR = a_0(PR_1, \ldots, PR_N) + a_1(PR_1) \cdot M_1 + \ldots a_N(PR_N) \cdot M_N \quad (2)$$

Note that the weight $a_0$ in this embodiment depends on all power ratios $PR_k$. The weight $a_0$, for example, may be a maximum one of the power ratios $PR_k$, a summation of those power ratios squared, or any function reflecting the distribution of powers between the carriers.

Of course, several possibilities exist for how to parameterize the power relations between the carriers, the parameterization chosen in equation (1) being just one example. In fact, only N−1 parameters are needed to uniquely characterize the power relations between N carriers. Thus, for a dual carrier signal (i.e., N=2), it is sufficient to use only one of the power ratios, such as that for carrier 1, $PR_1$, to characterize the power relation between the two carriers. Instead of using the parameterization in equation (2), for example, one may use:

$$MPR = \tilde{a}_0(PR_1) + \tilde{a}_1(PR_1) \cdot M_1 + \tilde{a}_2(PR_1) \cdot M_2 \quad (3)$$

where $$PR_1 = \frac{P_1}{P_2}.$$

Furthermore, there is a symmetry between the carriers in the sense that the results do not depend on the enumeration of the carriers, and as a consequence there are relations that can be established between the parameters. For example, in (3) it holds that $$\tilde{a}_0(PR_1) = \tilde{a}_0\left(\frac{1}{PR_1}\right) \text{ and that } \tilde{a}_2(PR_1) = \tilde{a}_1\left(\frac{1}{PR_1}\right).$$

Figure 4:
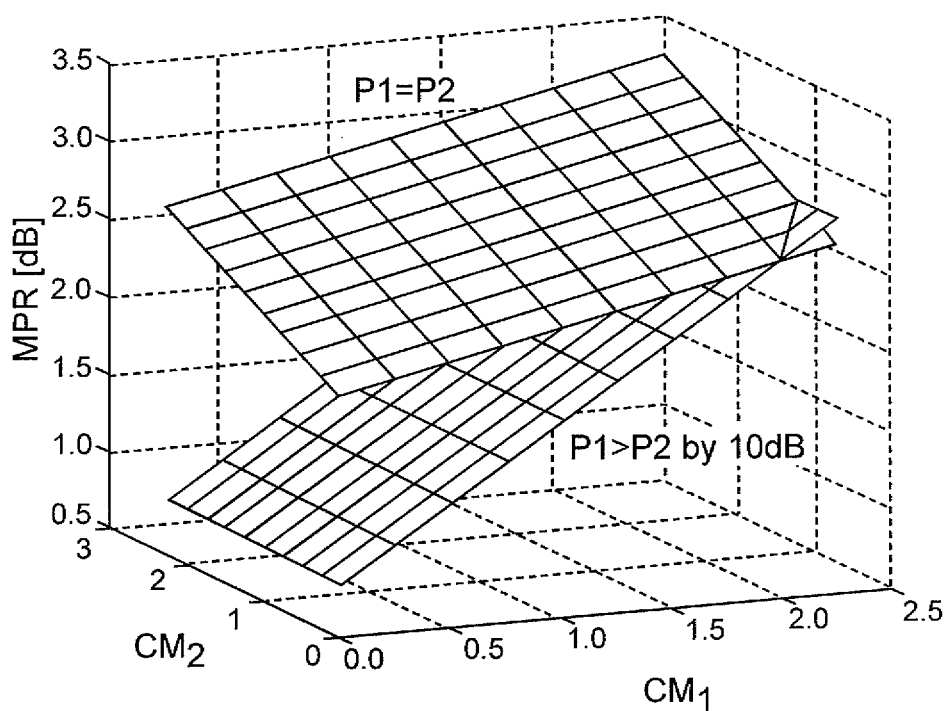
FIG. 4 is a graph illustrating a least squares fit of carrier-specific metrics to the required back-off metric, for different ratios of the power on the multi-carrier signal's carriers.
Figure 5:
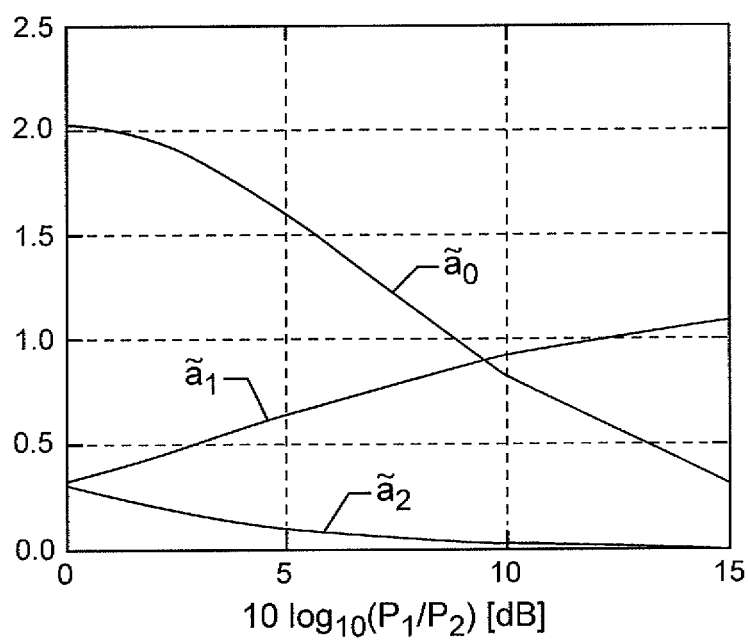
FIG. 5 is a graph illustrating the weights deducted from the least squares fit of FIG. 4.

FIGS. 4 and 5 provide a simple example of the above embodiment using equation (3) to characterize the power relations between the two carriers in a dual carrier signal (i.e., N=2). FIGS. 4 and 5 also illustrate one method for determining the dependence of the weights $\tilde{a}_0, \tilde{a}_1$, and $\tilde{a}_2$ on the power ratios $PR_k$. In this example, the required back-off metric MPR is empirically determined for different configurations of the dual carrier signal (e.g., via off-line calculation of the MPR of the dual carrier signal's compound waveform, measurements on actual RF circuits, or simulations using realistic RF front-end models). The carrier-specific metrics $M_1$ and $M_2$ are also determined, as $CM_1$ and $CM_2$, for those different configurations of the dual carrier signal. Having determined MPR, $M_1$, and $M_2$ in equation (3) for different configurations, values of weights $\tilde{a}_0, \tilde{a}_1$, and $\tilde{a}_2$ are deducted via a least-squares fit between $M_1$, $M_2$ and MPR for different power ratios $PR_1$. FIG. 4 shows the least-squares fit of weights $\tilde{a}_1, \tilde{a}_1$, and $\tilde{a}_2$, for $P_1 = P_2$ and $P_1 > P_2$ by 10 dB, approximated as linear planes. FIG. 5 shows the values of weights $\tilde{a}_0, \tilde{a}_1$, and $\tilde{a}_2$ deducted from this least squares fit, for all power ratios $PR_1$.

Regardless of how the power relations between the carriers are characterized, the value of the weights $a_0 \ldots a_N$ for different values of a corresponding power ratio $PR_k$ may be expressed in the estimation circuit 40 as a function of the power ratio $PR_k$, or stored in a look-up table. In one embodiment, for example, the back-off metric generation circuit 44 further includes a weight generation circuit 46. The weight generation circuit 46 is configured to calculate the weights $a_0 \ldots a_N$, or to retrieve them from a look-up table, based on the power ratio $PR_k$ corresponding to that weight.

In view of the above discussion, the estimation circuit 40 may require only a few relatively small look-up tables or simple computations: one for obtaining the carrier-specific metrics $M_1 \ldots M_N$ based on configuration parameters $config_k$ of each carrier k, and another for obtaining the weights $a_0 \ldots a_N$ based on a power ratio $PR_k$. Having determined these values, the estimation circuit 40 may estimate the back-off metric MPR according to equation (2) (likewise based on a computation or retrieval from a look-up table). Of course, while the above implementation advantageously requires less computational complexity and/or memory usage, still further simplifications and/or approximations are possible.

In one embodiment, for example, the weights $a_0 \ldots a_N$ are determined based on a range of the corresponding power ratio $PR_k$ rather than the precise value of that power ratio $PR_k$. Continuing the example of FIG. 5, the weight $\tilde{a}_0$ may be determined as 1.8, $\tilde{a}_1$ as 0.5, and $\tilde{a}_2$ as 0.25 if the range of the power ratio $PR_1$ falls anywhere below 5 dB. Conversely, the weight $\tilde{a}_0$ may be determined as 0.5, $\tilde{a}_1$ as 1.0, and $\tilde{a}_2$ as 0 if the range of the power ratio $PR_1$ falls anywhere above 10 dB. This quantization of a power ratio $PR_k$ and resulting weights $a_0 \ldots a_N$ further lessens the computational complexity and/or memory usage of the transmitter 10.

The above example demonstrates that the transmitter 10 can be further simplified by not calculating or retrieving one or more carrier-specific metrics $M_1 \ldots M_N$ under certain circumstances. When a power ratio $PR_k$ exceeds a certain value, for example, the weight applied to one or more carrier-specific metrics $M_1 \ldots M_N$ may become insignificant (e.g., in FIG. 5, when the power ratio $PR_1$ exceeds 10 dB, the weight $ã_2$ applied to $M_2$ approaches 0). In this case, the estimation circuit 40 may obtain a carrier-specific metric for less than all of the N carriers, or at least base estimation of the back-off metric MPR on less than all of the N carrier-specific metrics obtained.

By yet another approximation, the weights $a_0 \ldots a_N$ in one embodiment are pre-set, e.g. according to an assumed or worst-case operating condition of the transmitter 10 (e.g., where the power on all carriers are equal, such that all carriers contribute equally to driving the power amplifier 34 into its non-linear region). In this case, the weights $a_0 \ldots a_N$ are constants that do not actually vary with or otherwise depend on a power ratio $PR_k$.

Of course, while the embodiments described above with reference to FIGS. 3-5 base estimation of the back-off metric MPR on a power ratio $PR_k$, the present invention is not limited to such. Indeed, the back-off metric generation circuit 44 of FIG. 3 may receive other values, such as the configuration parameters of the carriers, instead of or in addition to the intended transmit power on each carrier. In this case, the back-off metric generation circuit 44 bases estimation of the back-off metric MPR on the carrier-specific metrics $M_1 \ldots M_N$ and one or more of these configuration parameters in a manner analogous to that described with respect to FIGS. 4 and 5. Again, the configuration parameters may vary depending on the whether the signal on carrier k is formatted according to standards for WCDMA, LTE, etc. For instance, the configuration parameters may include gain factors for the physical channel in the signal when formatted according to WCDMA, or resource block allocations and modulation scheme when formatted according to LTE.

Accordingly, although embodiments of the present invention have been primarily described herein with respect to multi-carrier operation in Wideband Code-Division Multiple Access (W-CDMA) systems, those skilled in the art will recognize that the inventive techniques disclosed and claimed herein are not so limited and may be advantageously applied to a wide array of multi-carrier wireless systems, such as a multi-carrier Long-Term Evolution (LTE) system, a multi-carrier Enhanced Data rates for GSM Evolution (EDGE) system, or the like.

It should be understood, therefore, that the foregoing description and the accompanying drawings represent non-limiting examples of the methods and individual apparatuses taught herein. As such, the present invention is not limited by the foregoing description and accompanying drawings. Instead, the present invention is limited only by the following claims and their legal equivalents.

What is claimed is:

1. A method in a wireless communication transmitter configured to transmit a multi-carrier signal, the multi-carrier signal being an aggregation of two or more separately modulated carriers occupying distinct frequency regions, comprising:
   obtaining, for each of the two or more carriers, a carrier-specific metric indicative of an amount by which the maximum transmit power on that carrier should be reduced from a pre-determined nominal maximum transmit power, if transmitted alone, to achieve a pre-determined out-of-band emission requirement; and
   estimating, by the wireless communication transmitter, a multi-carrier transmitter back-off metric for reducing the multi-carrier signal's maximum transmit power, based on the two or more carrier-specific metrics obtained.

2. The method of claim 1 wherein obtaining a carrier-specific metric comprises calculating the carrier-specific metric, or retrieving it from a lookup table, based on one or more configuration parameters of a signal on that carrier.

3. The method of claim 2 wherein the one or more configuration parameters comprise gain factors for the physical channels in a Wideband Code-Division Multiple Access (WCDMA) signal, or resource block allocations and modulation scheme in a Long Term Evolution (LTE) signal.

4. The method of claim 1 wherein obtaining a carrier-specific metric comprises obtaining a cubic metric, a peak-to-average power ratio, or a maximum-power reduction value.

5. The method of claim 1 wherein estimating the multi-carrier transmitter back-off metric is further based on a power ratio between the power of one or more channels on one of the carriers and the power of a corresponding one or more channels on other carriers.

6. The method of claim 5 wherein the power ratio comprises:
   a ratio between the power of all channels on one of the carriers and the power of all channels on other carriers; or
   a ratio between the power of a single control channel on one of the carriers and the power of a corresponding control channel on other carriers.

7. The method of claim 1 wherein estimating the multi-carrier transmitter back-off metric is further based on one or more configuration parameters of a signal on at least one of the carriers.

8. The method of claim 7 wherein the one or more configuration parameters comprise gain factors for the physical channels in a Wideband Code-Division Multiple Access (WCDMA) signal, or resource block allocations and modulation scheme in a Long Term Evolution (LTE) signal.

9. The method of claim 1 wherein estimating the multi-carrier transmitter back-off metric is based on a weighted sum of the two or more carrier-specific metrics obtained.

10. The method of claim 9 wherein the weight applied to each carrier-specific metric is a constant or, alternatively, depends on at least one of:
    a power ratio between the power of one or more channels on one of the carriers and the power of a corresponding one or more channels on other carriers; or
    one or more configuration parameters of a signal on at least one of the carriers.

11. The method of claim 9 wherein the weight applied to each carrier-specific metric depends on a power ratio between the power of one or more channels on one of the carriers and the power of a corresponding one or more channels on other carriers, and wherein the method further comprises calculating the weights, or retrieving them from a lookup table, based on the value of the power ratio or, alternatively, based on which one of a plurality of ranges the power ratio falls within.

12. A wireless communication transmitter configured to transmit a multi-carrier signal, the multi-carrier signal being an aggregation of two or more separately modulated carriers occupying distinct frequency regions, comprising:
    a multi-carrier transmitter back-off metric estimation circuit configured to:
       obtain, for each of the two or more carriers, a carrier-specific metric indicative of the amount by which the maximum transmit power on that carrier should be reduced from a pre-determined nominal maximum transmit power, if transmitted alone, to achieve a pre-determined out-of-band emission requirement; and estimate a multi-carrier transmitter back-off metric for reducing the multi-carrier signal's maximum transmit power, based on the two or more carrier-specific metrics obtained.

13. The wireless communication transmitter of claim 12 wherein the multi-carrier transmitter back-off metric estimation circuit is configured to obtain a carrier-specific metric by calculating the carrier-specific metric, or retrieving it from a lookup table, based on one or more configuration parameters of a signal on that carrier.

14. The wireless communication transmitter of claim 13 wherein the one or more configuration parameters comprise gain factors for the physical channels in a Wideband Code-Division Multiple Access (WCDMA) signal, or resource block allocations and modulation scheme in a Long Term Evolution (LTE) signal.

15. The wireless communication transmitter of claim 12 wherein the multi-carrier transmitter back-off metric estimation circuit is configured to obtain a carrier-specific metric as a cubic metric, a peak-to-average power ratio, or a maximum-power reduction value.

16. The wireless communication transmitter of claim 12 wherein the multi-carrier transmitter back-off metric estimation circuit is configured to estimate the multi-carrier transmitter back-off metric further based on a power ratio between the power of one or more channels on one of the carriers and the power of a corresponding one or more channels on other carriers.

17. The wireless communication transmitter of claim 16 wherein the power ratio comprises:
  a ratio between the power of all channels on one of the carriers and the power of all channels on other carriers; or
  a ratio between the power of a single control channel on one of the carriers and the power of a corresponding control channel on other carriers.

18. The wireless communication transmitter of claim 12 wherein the multi-carrier transmitter back-off metric estimation circuit is configured to estimate the multi-carrier transmitter back-off metric further based on one or more configuration parameters of a signal on at least one of the carriers.

19. The wireless communication transmitter of claim 18 wherein the one or more configuration parameters comprise gain factors for the physical channels in a Wideband Code-Division Multiple Access (WCDMA) signal, or resource block allocations and modulation scheme in a Long Term Evolution (LTE) signal.

20. The wireless communication transmitter of claim 12 wherein the multi-carrier transmitter back-off metric estimation circuit is configured to base the multi-carrier transmitter back-off metric on a weighted sum of the two or more carrier-specific metrics obtained.

21. The wireless communication transmitter of claim 20 wherein the weight applied to each carrier-specific metric is a constant or, alternatively, depends on at least one of:
  a power ratio between the power of one or more channels on one of the carriers and the power of a corresponding one or more channels on other carriers; or
  one or more configuration parameters of a signal on at least one of the carriers.

22. The wireless communication transmitter of claim 20 wherein the weight applied to each carrier-specific metric depends on a power ratio between the power of one or more channels on one of the carriers and the power of a corresponding one or more channels on other carriers, and wherein the multi-carrier transmitter back-off metric estimation circuit is further configured to calculate the weights, or retrieving them from a lookup table, based on the value of the power ratio or, alternatively, based on which one of a plurality of ranges the power ratio falls within.

* * * * *

UNITED STATES PATENT AND TRADEMARK OFFICE
CERTIFICATE OF CORRECTION

PATENT NO. : 8,472,535 B2
APPLICATION NO. : 12/489172
DATED : June 25, 2013
INVENTOR(S) : Wallén It is certified that error appears in the above-identified patent and that said Letters Patent is hereby corrected as shown below:

On the Title Page, item (75), under "Inventor", in Column 1, Line 1, delete "Wallen" and insert --Wallén--, therefor.

In the Specification

In Column 6, Line 25, delete "weights $\tilde{a}_1, \tilde{a}_1,$" and insert --weights $\tilde{a}_0, \tilde{a}_1,$--, therefor.

Signed and Sealed this
Fifth Day of November, 2013

Teresa Stanek Rea
*Deputy Director of the United States Patent and Trademark Office*